United States Patent [19]
Henry et al.

[11] Patent Number: 6,034,193
[45] Date of Patent: *Mar. 7, 2000

[54] PHOTOCHROMIC ORGANIC MATERIALS

[75] Inventors: David Henry, St. Michel S/Orge; Jacques Vial, Noisy S/Ecole, both of France

[73] Assignee: Corning Incorporated, Corning, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/945,235

[22] PCT Filed: Jun. 20, 1996

[86] PCT No.: PCT/US96/10654

§ 371 Date: Oct. 19, 1997

§ 102(e) Date: Oct. 19, 1997

[87] PCT Pub. No.: WO97/03373

PCT Pub. Date: Jan. 30, 1997

[30] Foreign Application Priority Data

Jul. 12, 1995 [FR] France .................. 95/08424

[51] Int. Cl.⁷ .............. C08F 2/38; C08F 4/04; G02B 5/23; C08K 5/35
[52] U.S. Cl. .......... 526/222; 526/219.6; 526/224; 526/313; 526/329.2; 526/218.1; 523/105; 523/106; 524/95; 524/104; 524/110; 252/586; 359/722
[58] Field of Search .............. 523/106; 524/95, 524/104, 110; 252/586; 526/218.1, 222, 224, 219.6, 313, 328.5, 329.2; 359/722

[56] References Cited

U.S. PATENT DOCUMENTS

| | | |
|---|---|---|
| 3,136,000 | 6/1964 | Slyk . |
| 3,562,172 | 2/1971 | Ono et al. . |
| 3,881,683 | 5/1975 | Whitney . |
| 3,957,740 | 5/1976 | Blank et al. .......... 526/318.4 |
| 4,215,010 | 7/1980 | Hovey et al. . |
| 4,306,780 | 12/1981 | Tarumi et al. .......... 526/313 |
| 4,342,668 | 8/1982 | Hovey et al. . |
| 4,634,767 | 1/1987 | Hoelscher . |
| 4,637,698 | 1/1987 | Kwak et al. . |
| 4,699,473 | 10/1987 | Chu . |
| 4,720,547 | 1/1988 | Kwak et al. . |
| 4,756,973 | 7/1988 | Sakagami et al. . |
| 4,785,097 | 11/1988 | Kwak . |
| 4,792,224 | 12/1988 | Kwiatkowski et al. . |
| 4,816,584 | 3/1989 | Kwak et al. . |
| 4,831,142 | 5/1989 | Kwak . |
| 4,851,530 | 7/1989 | Rickwood . |
| 4,889,413 | 12/1989 | Ormsby et al. . |
| 4,909,963 | 3/1990 | Kwak et al. . |
| 4,913,544 | 4/1990 | Rickwood et al. . |
| 4,931,219 | 6/1990 | Kwiatkowski et al. . |
| 4,931,221 | 6/1990 | Heller . |
| 4,936,995 | 6/1990 | Kwiatkowski . |
| 4,980,089 | 12/1990 | Heller . |

(List continued on next page.)

FOREIGN PATENT DOCUMENTS

| | | |
|---|---|---|
| A-0171909 | 1/1992 | European Pat. Off. . |
| A 0508219 | 10/1992 | European Pat. Off. . |
| A 0232295 | 6/1993 | European Pat. Off. . |
| A 0562915 | 9/1993 | European Pat. Off. . |
| WO-A-92/ 05209 | 4/1992 | WIPO . |

OTHER PUBLICATIONS

Photochromism, G. Brown, Editor, Techniques of Chemistry, Wiley Interscience, vol. III, 1971, Chapter III. pp. 45–294, R. C. Bertelson.

Photochromism, Molecules & Systems, Edited by H. Durr, H. Bouas–Laurent, Elsevier 1990, Chapter 8: Spiropyrans, pp. 314–455, R. Guglielmetti.

*Primary Examiner*—Tae Yoon
*Attorney, Agent, or Firm*—Angela N. Nwaneri; Peter Rogalskyj

[57] ABSTRACT

The invention relates to photochromic transparent organic materials presenting an index of refraction of more than 1.55, which are free of optical distortions and are prepared by radical polymerization of a polymerizable composition comprising:

a) 80–95 wt % of at least one monomer represented by the general formula (I):

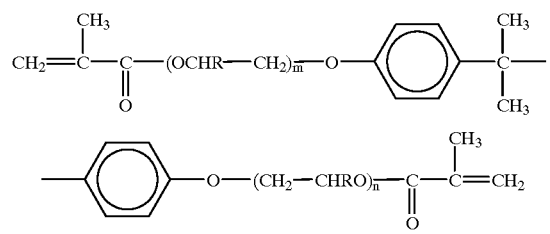

where R=H or $CH_3$, and m and n are independently 1 or 2;

b) 5–20 wt % of at least one aromatic monovinyl monomer represented by the general formula (II):

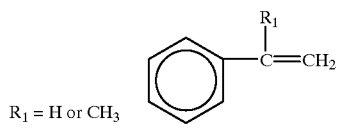

$R_1$ = H or $CH_3$ c) an effective quantity of at least one dye that imparts photochromic properties to the material, selected from the groups of spiroxazines, spiropyrans and chromenes;
d) an effective quantity of a chain transfer agent; and
e) an effective quantity of a radical polymerization initiator, characterized in that the chain transfer agent is a linear alkanethiol and the radical polymerization initiator is a diazo compound.

20 Claims, No Drawings

U.S. PATENT DOCUMENTS

| | | |
|---|---|---|
| 4,986,934 | 1/1991 | Kwiatkowski et al. . |
| 5,066,818 | 11/1991 | Gemert et al. . |
| 5,106,998 | 4/1992 | Tanaka et al. . |
| 5,114,621 | 5/1992 | Guglielmetti et al. . |
| 5,130,058 | 7/1992 | Tanaka et al. . |
| 5,139,707 | 8/1992 | Guglielmetti et al. . |
| 5,166,345 | 11/1992 | Akashi et al. . |
| 5,171,636 | 12/1992 | Castaldi et al. . |
| 5,180,524 | 1/1993 | Casilli et al. . |
| 5,200,116 | 4/1993 | Heller . |
| 5,233,038 | 8/1993 | Guglielmetti et al. . |
| 5,238,981 | 8/1993 | Knowles . |
| 5,244,602 | 9/1993 | Van Gemert . |
| 5,395,566 | 3/1995 | Kobayakawa et al. ............... 252/586 |
| 5,442,022 | 8/1995 | Keita et al. ............................. 526/313 |

PHOTOCHROMIC ORGANIC MATERIALS

BACKGROUND OF THE INVENTION

The invention relates to novel photochromic transparent organic materials with high index of refraction presenting no optical distortion in solid form, a method for their preparation, and the articles made from these materials.

It is difficult to prepare such a photochromic ophthalmic lens made of plastic material. Ideally, the polymer matrix of such a lens should be crosslinked thermally, free of optical distortion in solid form and able to receive appropriate mixtures of photochromic dyes and to be crosslinked in the presence of such appropriate mixtures of photochromic dyes, for example spiroxazines and chromenes, to obtain a material which presents a high initial transmission before exposure and a high capacity for darkening after exposure, all with rapid darkening and lightening kinetics. In addition, the material should have a low thermal dependence, a high resistance to fatigue, and as high an index of refraction as possible.

Obviously, no such ideal material exists to date.

WO-A-92/05209 describes a copolymer that is free of optical distortions and is suitable for the manufacture of eyeglasses, and is obtained by a radical polymerization of a first monomer with formula I

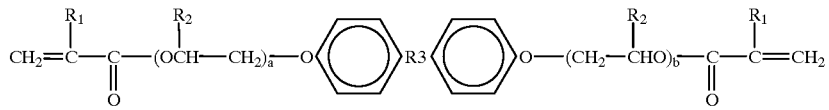

where a and b are whole numbers from 0 to 4, $R_1$ and $R_2$=H or $CH_3$, and $R_3$=—O—, —S—, —CO—, —SO$_2$—, —CH$_2$—, —CH=CH— or

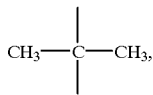

with a second monomer, which can be styrene or a styrene derivative an, optionally, a third monomer, which can be a vinyl aromatic compound or an aromatic methacrylate, in the presence of an initiator of the peroxide type and of a chain transfer agent selected from various brominated compounds.

This copolymer could be a good polymer matrix for an ophthalmic article, such as a lens.

However, when one tries to incorporate ophthalmic dyes in the copolymerizable composition to impart ophthalmic properties to the matrix obtained after copolymerization, it can be observed that said dyes are destroyed by the peroxide initiator.

Even if the peroxide initiator is replaced by a milder radical polymerization initiator, such as a diazo compound, for example, azobisisobutyronitrile, the material obtained is still unsatisfactory, because the photochromic dyes are inhibited by the bronninated chain transfer agent used, as has been observed by the present inventors. It is also necessary to later incorporate the dyes into the matrix notably by a specific thermal diffusion method, which increases the cost price of the material and complicates its manufacturing process.

Thus, there is a need for high-performance ophthalmic materials that are easy and inexpensive to manufacture.

The present invention is intended to meet this need.

SUMMARY OF THE INVENTION

More particularly, the present invention concerns novel ophthalmic transparent organic materials presenting an index of refraction of more than 1.55, which are free of optical distortions and are prepared by radical polymerization of a polymerizable composition comprising:

a) 80–95 wt % of at least one monomer represented by the general formula (I):

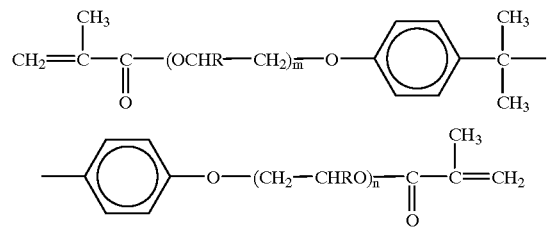

where R=H or $CH_3$, and m and n are independently 1 or 2;

b) 5–20 wt % of at least one aromatic monovinyl monomer represented by the general formula (II):

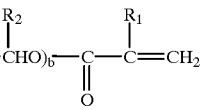

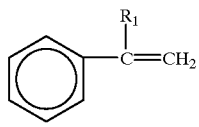

where $R_1$=H or $CH_3$ c) an effective quantity of at least one dye that imparts photochromic properties to the material, selected from the groups of spiroxazines, spiropyrans and chromenes;

d) an effective quantity of a chain transfer agent; and e) an effective quantity of a radical polymerization initiator;

characterized in that the chain transfer agent is a linear alkanethiol and the radical polymerization initiator is a diazo compound.

Optionally, the polymerizable composition can contain, in addition, f) up to 10 wt % of an aromatic divinyl monomer represented by the general formula (III):

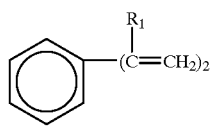

where $R_1$=H or $CH_3$.

The invention also relates to a method for the preparation of novel photochromic transparent organic materials presenting an index of refraction of more than 1.55, which are free of optical distortions, characterized in that it consists of carrying out a radical polymerization of a polymerizable composition comprising:

a) 80–95 wt % of at least one monomer represented by the general formula (I):

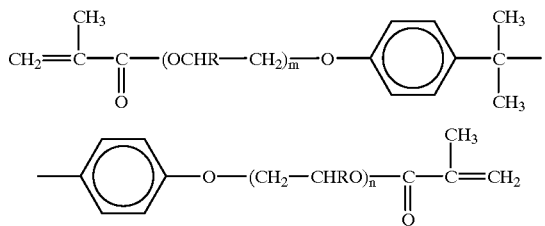

where R=H or CH$_3$, and m and n are, independently, 1 or 2;

b) 5–20 wt % of at least one aromatic monovinyl monomer represented by the general formula (II):

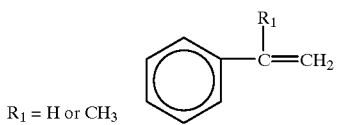

c) an effective quantity of at least one dye that imparts photochromic properties to the material, selected from the groups of spiroxazines, spiropyrans and chromenes;

d) an effective quantity of a chain transfer agent; and e) an effective quantity of a radical polymerization initiator.

Optionally, it is also possible that in the polymerizable composition can contain, in addition.

f) up to 10 wt % of an aromatic divinyl monomer represented by the general formula (III):

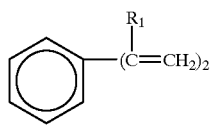

where R$_1$=H or CH$_3$.

The monomers (a) with formula I are well known and commercially available. For example, a monomer with formula I where R=H and m and n=2 is marketed by the company Akzo under the trade name Diacryl 121. Styrene and methylstyrene are the monomers (b) with formula II. The monomers (f) with formula III are represented by divinylbenzene and di(methylvinyl)benzene.

By an appropriate selection of the monomers (a), (b) and (f) and their proportions, the kinetic parameters of the final photochromic material (darkening rate, bleaching rate) can be adjusted as desired: the addition of a monomer (b) such as styrene to the dimethacrylic compound (a), besides having an advantageous effect on the optical properties, also reduces the kinetics of the dyes that would intrinsically be too rapid in the methacrylic matrix. Conversely, the optional incorporation of a third monomer (f), such as divinylbenzene, on the contrary allows the acceleration of a dye that would be too slow in the methacrylic matrix. Thus, by a careful selection of the ratio by weight of monomer (b):optional monomer (f), it is possible in a dimethacrylic matrix such as the one described to adjust the kinetic parameters of the photochromic process to a desired value without altering the optical quality of the materials obtained and while preserving a high index of refraction.

The photochromic dye (c) can be selected from the general classes of spiroxazines, spiropyrans and chromenes with photochromic properties imparted. A very large number of photochromic dyes of this type have been described in the literature and are commercially available. Usable spiroxazine dyes have been described notably in U.S. Pat. Nos. 3,562,172, 4,634,767, 4,637,698, 4,720,547, 4,756,973, 4,785,097, 4,792,224, 4,816,584, 4,831,142, 4,909,963, 4,931,219, 4,936,995, 4,986,934, 5,114,621, 5,139,707, 5,233,038, 4,215,010, 4,342,668, 4,699,473, 4,851,530, 4,913,544, 5,171,636, 5,180,524, 5,166,345 and in EP-A 0,508,219, 0,232,295, and 0,171,909, among others. Usable chromenes have been described in U.S. Pat. Nos. 567,605, 4,889,413, 4,931,221, 5,200,116, 5,066,818, 5,244,602, 5,238,981, 5,106,998, 4,980,089, 5,130,058, and in EP-A 0,562,915, among others. Useful spiropyrans have also been described in the following general works:

Photochromism, G. Brown, Editor, Techniques of Chemistry, Wiley Interscience, Vol. III, 1971, Chapter III. pages 45–294, R. C. Bertelson.

Photochromism, Molecules & Systems, Edited by H. Dürr, H. Bouas-Laurent, Elsevier 1990, Chapter 8: Spiropyrans, pages 314–455, R. Guglielmetti.

The teachings of all these patents and documents are incorporated here by reference.

As a nonlimiting indication, the proportion of the photochromic dyes to be incorporated in the polymerizable composition can range from 0.01 to 1.0 wt %, preferably 0.05–0.5 wt %, with respect to the weight of the monomers.

It is also preferred to use a combination of photochromic dyes which impart a gray or brown tint in the darkened state.

The chain transfer agent (d) is selected from the C$_2$–C$_{16}$ linear alkanethiols. Linear C$_4$–C$_{16}$ alkanethiols are preferred, because they are less volatile than the C$_2$ or C$_3$ homologs. Specific examples are: butanethiol, pentanethiol, hexanethiol, heptanethiol, octanethiol, decanethiol, dodecanethiol and tetradecanethiol. Purely as an indication, the chain transfer agent can be incorporated in the polymerizable composition in a proportion of 100–5,000 ppm, for example, with respect to the monomers. Another product which we have found to be useful both as a chain transfer agent and as a chain extender is bis-mercapoethyl ether (MEE) having the general formula:

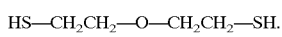

The radical polymerization initiator (e) is selected from the diazo initiator.

These compounds are well known and available commercially. Specific examples are azobisisobutyronitrile (AIBN) and 2,2'-azobis(2-methylbutyronitrile) (AMBN), among others. Purely as an indication, a proportion of initiator equivalent to about 0.05–0.5 wt % of the monomers can be incorporated in it.

The joint use of an alkanethiol as ingredient (d) and a diazo compound as ingredient (e) allows the obtention of the advantages procured by the invention, that is, the possibility of preparing a photochromic material with excellent properties by a radical polymerization in the presence of at least one photochromic dye.

The invention concerns the articles made in their entirety or in part of an organic photochromic material according to the invention. Nonlimniting examples of such articles are ophthalmic corrective lenses, sun-protection lenses, window glass for vehicles or buildings, etc. In these articles, the photochromic material of the invention can comprise the entire thickness of the article (solid article), or it can be in the form of a film or a stratified layer applied to a transparent or mineral support.

The ophthalmic lenses are the preferred articles, and they can be produced conveniently by carrying out the polymerization in lens molds, for example, as described in U.S. Pat. Nos. 2,242,386, 3,136,000 or 3,881,683.

In order to explain the invention clearly, the following nonlimiting examples are given. All the proportions indicated are parts by weight. In all the examples, the polymerization of the polymerizable composition is conducted in a lens mold under the following conditions: The polymerizable composition is heated slowly until the beginning of the thermal degradation of the diazo compound (e) with release of free radicals. Once the temperature has reached 53° C., it is maintained for 16 hours; then, within 3 hours, the temperature is raised to 90° C., and then maintained for 2 hours. The lens obtained is then removed from the mold. The raw materials used in the examples are the following:

| Monomers: | |
|---|---|
| Diacryl 121 (available from Akzo Chemical) | (DIA) |
| Styrene | (STY) |
| Divinylbenzene | (DVB) |
| α-Methylstyrene | (MST) |
| Catalysts: | |
| 2,2'-Azobis-2-methylbutyronitrile | (AMBN) |
| Azobisisobutyronitrile | (AIBN) |
| Chain transfer agent: | |
| Dodecanethiol (according to the invention) | (DDT) |
| Tetrabromomethane (comparative example) | (TBM) |
| Bis-mercapoethyl ether | (MEE) |
| Photochromic dyes: | |

| Name | Manufacturer | Chemical type |
|---|---|---|
| Blue D | (Great Lakes) | Spiroxazine |
| Red PNO | (Great Lakes) | Spiroxazine |
| Yellow L | (Great Lakes) | Chromene |
| Sea Green | (James Robinson Ltd.) | Spiroxazine |

| Monomers: | | |
|---|---|---|
| Berry Red | (James Robinson Ltd.) | Chromene |

EXAMPLES 1–8

Examples 1–8 show the efficacy of the chain transfer agents (DDT) and (MEE) in eliminating optical distortions (For this purpose only, the examples are provided in polymerizable compositions without photochromic dye).

| | Monomers (g) | | | Chain Transfer Agent (g) | | | Catalyst | | Appearance | |
|---|---|---|---|---|---|---|---|---|---|---|
| Ex | DIA | STY | DVB | DDT | TBM | MEE** | AMBN (g) | AIBN (g) | # | $n_d$ |
| 1 | 100 | — | — | — | 0.4 | — | 0.2 | — | Lg distortions | 1.557 |
| 2 | 80 | 20 | — | — | 0.4 | — | 0.2 | — | distortions | 1.565 |
| 3 | 80 | 20 | — | 0.4 | — | — | 0.2 | — | no distortions | * |
| 4 | 80 | 10 | 10 | 0.4 | — | — | 0.2 | — | no distortions | 1.566 |
| 5 | 100 | — | — | — | — | 0 | — | 0.2 | | |
| 6 | 98 | — | — | — | — | 2 | — | 0.2 | | |
| 7 | 96 | — | — | — | — | 4 | — | 0.2 | | |
| 8 | 94 | — | — | — | — | 6 | — | 0.2 | | |

Examination in polarized light
*not measured
**works both as a chain transfer agent as well as a chain extender The mixtures of examples 5–8 were polymerized in a lens mold using the following schedule:

16 hours at 65° C.

1 hour at 70° C.

1 hour at 80° C.

1 hour at 110° C.

The indices of refraction of the materials of Examples 1, 2 and 4 were, respectively, 1.557, 1.565 and 1.566.

EXAMPLES 9–16

These examples show that inventive chain transfer agents, dodecanethiol (DDT) and Bis-mercapoethyl ether (MEE) do not alter the photochromic properties of the dyes, in contrast to the tetrabromomethane (TBM) of the prior art. The chain transfer agents and the dyes used, as well as their proportions and the photochromic proportions of the material obtained, are indicated in the table below.

| Example | wt. % | | | | Before Aging | | After Aging | |
|---|---|---|---|---|---|---|---|---|
| | TBM | DDT | MEE | Dye | $T_o^{(1)}$ | $T_{D15(2)}$ | $T_o$ | $T_{D15}$ |
| 9 | — | — | — | Blue D (0.2) | 80 | 11 | 80 | 16 |
| 10 | — | — | — | Red PNO (0.025) | 80 | 11 | 80 | 14 |
| 11 | 0.4 | — | — | Blue D (0.2) | 80 | 80 | — | — |
| 12 | 0.4 | — | — | Red PNO (0.025) | 0.3 | 0.3 | — | — |
| 13 | — | 0.4 | — | Blue D (0.2) | 80 | 11 | 81 | 16 |
| 14 | — | 0.4 | — | Red PNO (0.025) | 81 | 10.5 | 82 | 13 |

In examples 9–14, the polymenrzable composition consisted of Diacryl 121 (80 parts), styrene (20 parts) and AMBN (0.2 part).

In example 15, the polymerizable composition consisted of 100 grams Diacryl 121, 0.2 grams AIBN and no chain transfer agent.

In example 16, the polymerizable composition consisted of 94 grams Diacryl 121; 0.2 grams of AIBN and 6 grams of MEE.

The 250-hour aging consisted of exposure to a 60,000-lx xenon lamp ($\lambda$=560 nm), at 30° C.

$T_o$ is the initial transmission of the lens $T_{D15}$ is the transmission after 15 min of exposure at 20° C. under a xenon lamp (thickness of the sample: 2 mm).

|  | wt. % | | | | $t_½$ (sec)* | |
|---|---|---|---|---|---|---|
| Example | TBM | DDT | MEE | Dye | Darkening | Fading |
| 15 | — | — | — | Blue D (0.2) | 8 | 12 |
| 16 | — | — | 0.6 | Blue D (0.2) | 14 | 18 |

*$t_½$ (dark) is the time required to attain 50% darkening, while $t_½$ (fade) is the time required to attain 50% fading.

EXAMPLES 17 AND 18

These examples demonstrate that the use of AMBN instead of a conventional organic peroxide does not change the photochromic properties.

In these examples, the polymerizable composition consisted of 80 parts of Diacryl 121, 20 parts of styrene, 0.4 part of DDT and the quantities of initiator and dye indicated in the table below, which also gives the values of To and $T_{D15}$.

| | Ex | AMBN | Benzoyl Peroxide | Dye | $T_o$ | $T_{D15}$* |
|---|---|---|---|---|---|---|
| Comparative | 17 | — | 0.4 | Sea Green 0.015 | 86 | 74 |
| Inventive | 18 | 0.4 | — | Sea Green 0.015 | 86 | 11 |

*at $\lambda$ = 630 nm (absorption wavelength of Sea Green).

EXAMPLES 19–23

These examples show that the chain transfer agent (DDT), even if used at high concentrations, has no harmful effect on the mechanical properties of the material obtained, as shown in Examples 19–23. In these examples, the polymerizable composition consisted of 80 parts of Diacryl 121, 20 parts of styrene, 0.4 part of AMBN and the percentage of DDT indicated in the table below, which also gives the Shore D hardness of the material obtained. The polymerizable compositions for these examples were prepared without any dyes.

| | wt % | | |
|---|---|---|---|
| Example | DDT | MEE | Shore D Hardness |
| 5 | — | 0 | 85 |
| 6 | — | 2.0 | 85 |
| 7 | — | 4.0 | 84 |
| 8 | — | 6.0 | 82 |
| 19 | 0 | — | 86 |
| 20 | 0.4 | — | 87 |
| 21 | 0.8 | — | 87 |
| 22 | 1.2 | — | 86 |
| 23 | 3.0 | — | 86 |

EXAMPLES 24–32

These examples are intended to illustrate the effects resulting from the copolymerization of monomers (b) and possibly (f) with the monomer (a).

With regard to the addition of styrene (STY) or a mixture of STY+DVB to the Diacryl 121, besides the fact that in all the cases no optical distortion is observed, the mechanical properties of the matrix are improved. Thus, an elevation of the Tg is observed in the case of the styrene (STY) and of the hardness in the case of STY+DVB. In these examples, the polymerizable composition consisted of 0.2 part of AMBN and 0.4 part of DDT, in addition to the ingredients indicated in the table below which also indicates the Tg (glass transition temperature) and the Shore D hardness of the material obtained.

| Example | DIA | STY | DVB | Tg | Shore D Hardness | DVB/STY |
|---|---|---|---|---|---|---|
| 24 | 100 | 0 | — | 110 | — | 0 |
| 25 | 95 | 5 | — | 112 | — | 0 |
| 26 | 85 | 15 | — | 121 | — | 0 |
| 27 | 80 | 20 | — | 124 | — | 0 |
| 28 | 90 | 10 | — | — | 85 | 0 |
| 29 | 90 | 10 | 2 | — | 86 | 0.2 |
| 30 | 90 | 10 | 4 | — | 86 | 0.4 |
| 31 | 90 | 10 | 6 | — | 86–87 | 0.6 |
| 32 | 90 | 10 | 10 | — | 87 | 1.0 |

EXAMPLES 33–39

These examples show that the styrene has an effective slowing down the photochromic kinetics of the dyes in the copolymer matrix compared to a matrix formed from Diacryl 121 as the only monomer (Examples 33–37), that the divinyl-benzene has the opposite effect (Example 38), and that a mixture of styrene-divinylbenzene allows the adjustment of the kinetics to the desired value (Example 39).

In these examples, the polymerizable composition consisted of 0.2 part of AMBN, 0.4 part of DDT, 0.015 part of Sea Green dye and 0.30 part of Berry Red dye, in addition to the monomers indicated in the table below, which also indicates the time for half-bleaching of the lenses obtained.

| Example | DIA | STY | DVB | T ½ bleaching * (in sec., 25° C., 560 nm) | DVB/STY |
|---|---|---|---|---|---|
| 33 | 100 | — | — | 300 | — |
| 34 | 95 | 5 | — | 330 | 0 |
| 35 | 90 | 10 | — | 460 | 0 |
| 36 | 85 | 15 | — | 550 | 0 |
| 37 | 80 | 20 | — | 630 | 0 |
| 38 | 95 | — | 5 | 100 | — |
| 39 | 80 | 11.7 | 7.3 | 330 | 0.62 |

* After an exposure time of 15 min. under the xenon lamp.

The comparison of Examples 34 and 38 provides a good illustration of the contrary effects of the two monomers, styrene and divinylbenzene, which suppress the optical distortions in the matrix.

EXAMPLES 40 and 41

These examples show that identical results can also be obtained by using α-methylstyrene instead of styrene (Examples 40–41).

In these examples, the polymerizable composition consisted of 0.2 part of AMBN, 0.4 part of DDT, 0.015 part of Sea Green dye, and 0.30 part of Berry Red dye, in addition to the monomers indicated in the table below, which also indicates the half-bleaching time of the lenses obtained.

| Example | DIA | -Methylstyrene | Tg | T ½ bleaching (dry), (sec.) 25° C., 560 nm |
|---|---|---|---|---|
| 40 | 95 | 5 | 112 | 350 |
| 41 | 90 | 10 | 118 | 350 |

We claim:

1. Photochromic transparent organic materials presenting an index of refraction of more than 1.55, which are free of optical distortions, and prepared by radical polymerization of a polymerizable composition comprising:
   a) 80–95 wt % of at least one monomer represented by the general formula (I):

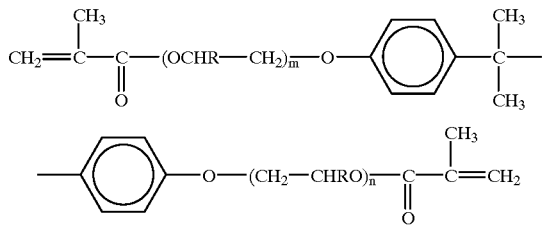

where R=H or CH$_3$, and m and n are independently 1 or 2;
   b) 5–20 wt % of at least one aromatic monovinyl monomer represented by the general formula (II):

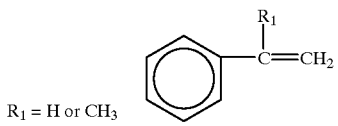

R$_1$ = H or CH$_3$ c) an effective quantity of at least one dye that imparts photochromic properties to the material, selected from the group consisting of spiroxazines, spiropyrans and chromenes;
   d) an effective quantity of a linear alkanethiol chain transfer agent; and
   e) an effective quantity of a diazo compound as a radical polymerization initiator.

2. Materials according to claim 1, wherein the polymerizable composition further comprises up to 10 wt % of an aromatic divinyl monomer represented by the general formula (III):

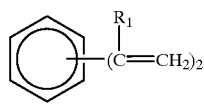

R$_1$=H or CH$_3$.

3. Materials according to claim 2, wherein the ratio of the aromatic divinyl monomer to the aromatic monovinyl monomer is in the ratio of 0 to 2.

4. Materials according to claim 3, wherein the aromatic monovinyl monomer is styrene.

5. Materials according to claim 4, wherein the aromatic divinyl monomer is divinyl benzene, and the ratio of divinyl benzene to styrene is in the range of 0.2 to 1.0.

6. Materials according to claim 1, wherein R=H, and m=n=2.

7. Materials according to claim 1, characterized in that the chain transfer agent (d) is a C$_4$–C$_{16}$ alkanethiol or a bismercaptoalkylether.

8. Materials according to claim 7, characterized in that the chain transfer agent is selected from the group consisting of butanethiol, pentanethiol, hexanethiol, heptanethiol, octanethiol, decanethiol, dodecanethiol tetradecanethiol, and bis-mercaptoethyl ether.

9. Materials according to claim 8, wherein the chain transfer agent is present in an amount in the range of 0.1–6.0 wt %.

10. Materials according to claim 9, characterized in that the quantity of chain transfer agent is in the range of 100–5,000 ppm.

11. Materials according to claim 1, characterized in that the radical polymerization initiator (e) is selected from the group consisting of azobisisobutyronitrile and 2,2'-azobis(2-methylbutyronitrile).

12. Materials according to claim 2, characterized in that the aromatic divinyl monomer is divinylbenzene.

13. Materials according to claim 1, wherein the polymerizable composition comprises a mixture of photochromic dyes, such mixture being capable of imparting a gray or brown tint to the materials in a darkened state.

14. Materials according to claim 1, characterized in that the quantity of radical polymerization initiator is in the range of 0.05–0.5 wt. %.

15. Method for the preparation of photochromic transparent organic materials having an index of refraction of at least 1.55, said method comprising radical polymerization of a polymerizable composition comprising:
   a) 80–95 wt % of at least one monomer represented by the general formula (I):

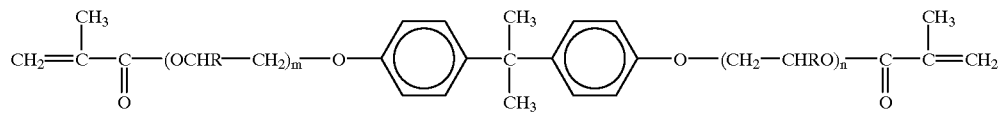

where R=H or CH$_3$, and m and n are, independently, 1 or 2;
   b) 5–20 wt % of at least one aromatic monovinyl monomer represented by the general formula (II):

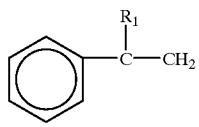

R=H or CH$_3$;

c) an effective quantity of at least one dye that imparts hotochromic properties to the material, selected from the soups of spiroxazines, spiropyrans, and chromenes;
d) an effective quantity of a chain transfer agent; and
e) an effective quantity of a radical polymerization initiator; provided that (1) the chain transfer agent is a linear alkanethiol chain transfer agent; (2) the radical polymerization initiator is a diazo radical polymerization initiator; or (3) the chain transfer agent is a linear alkanethiol chain transfer agent and the radical polymerization initiator is a diazo radical polymerization initiator.

16. Method according to claim 15, wherein the polymerizable composition further comprises up to 10 wt. % of an aromatic divinyl monomer represented by the general formula (III):

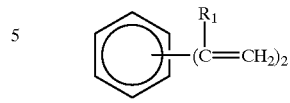

where R$_1$=H or CH$_3$.

17. Method according to claim 15, characterized in that the quantity of chain transfer agent is in the range of 100–5,000 ppm.

18. Method according to claim 15, characterized in that the quantity of a radical polymerization initiator is in the range of 0.05–0.5 wt %.

19. Photochromic article comprising a photochromic organic material according to claim 1.

20. Photochromic article according to claim 19, wherein said article is an ophthalmic lens or a sun-protection lens.

* * * * *